Figure 1:
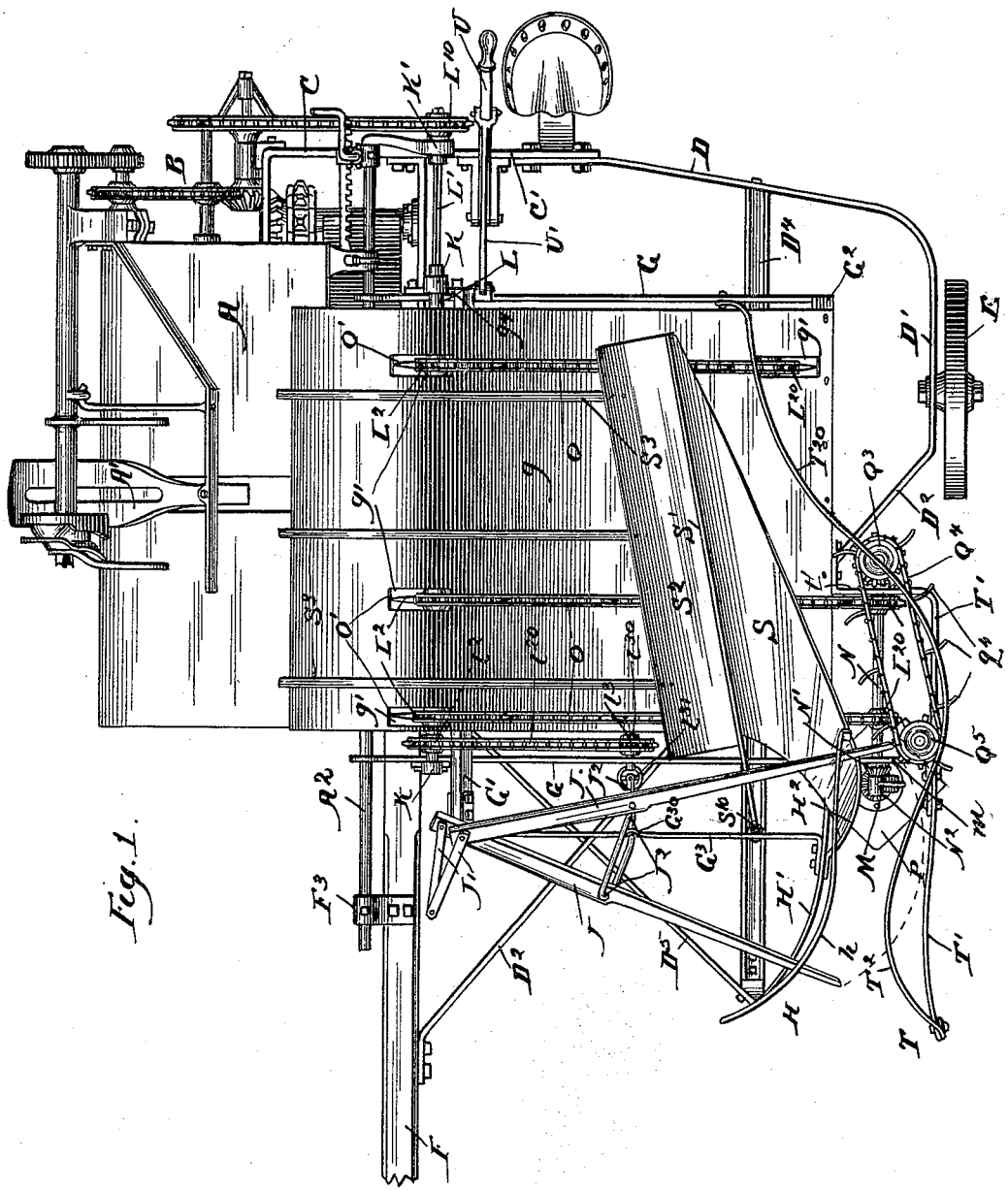

(No Model.) 5 Sheets—Sheet 1.

A. STARK.
CORN HARVESTER.

No. 480,975. Patented Aug. 16, 1892.

Witnesses:
Jean Elliott
Julia Usler

Inventor:
Andrew Stark
By Burton and Burton
his Attorneys

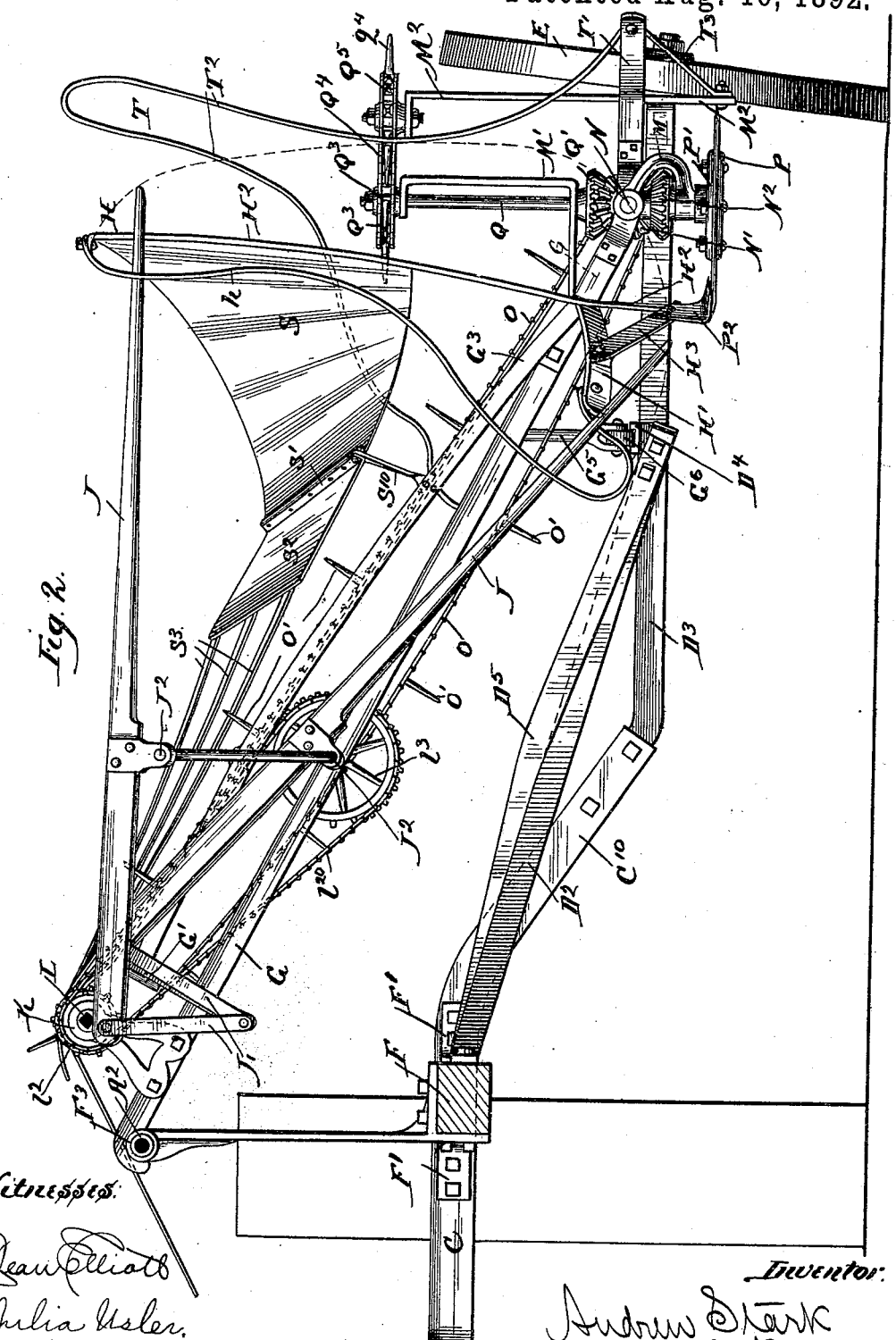

(No Model.) 5 Sheets—Sheet 3.
A. STARK.
CORN HARVESTER.
No. 480,975. Patented Aug. 16, 1892.
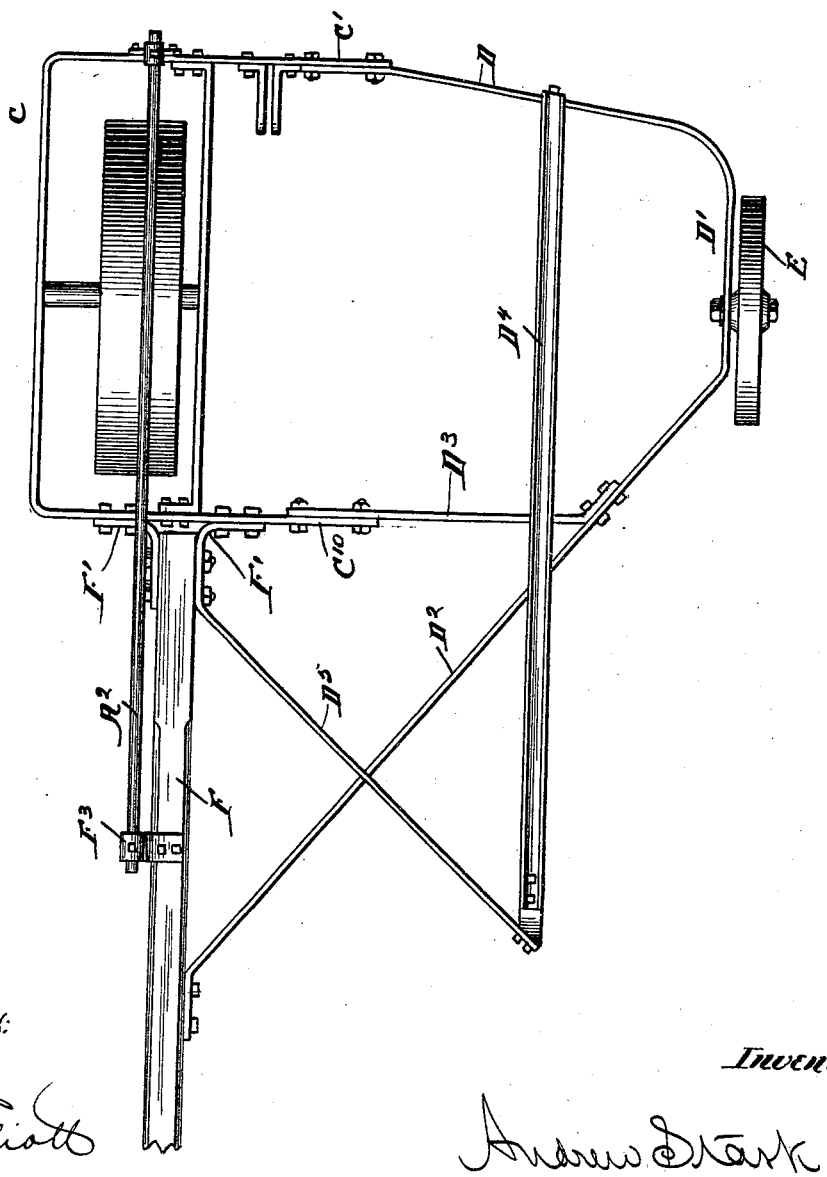

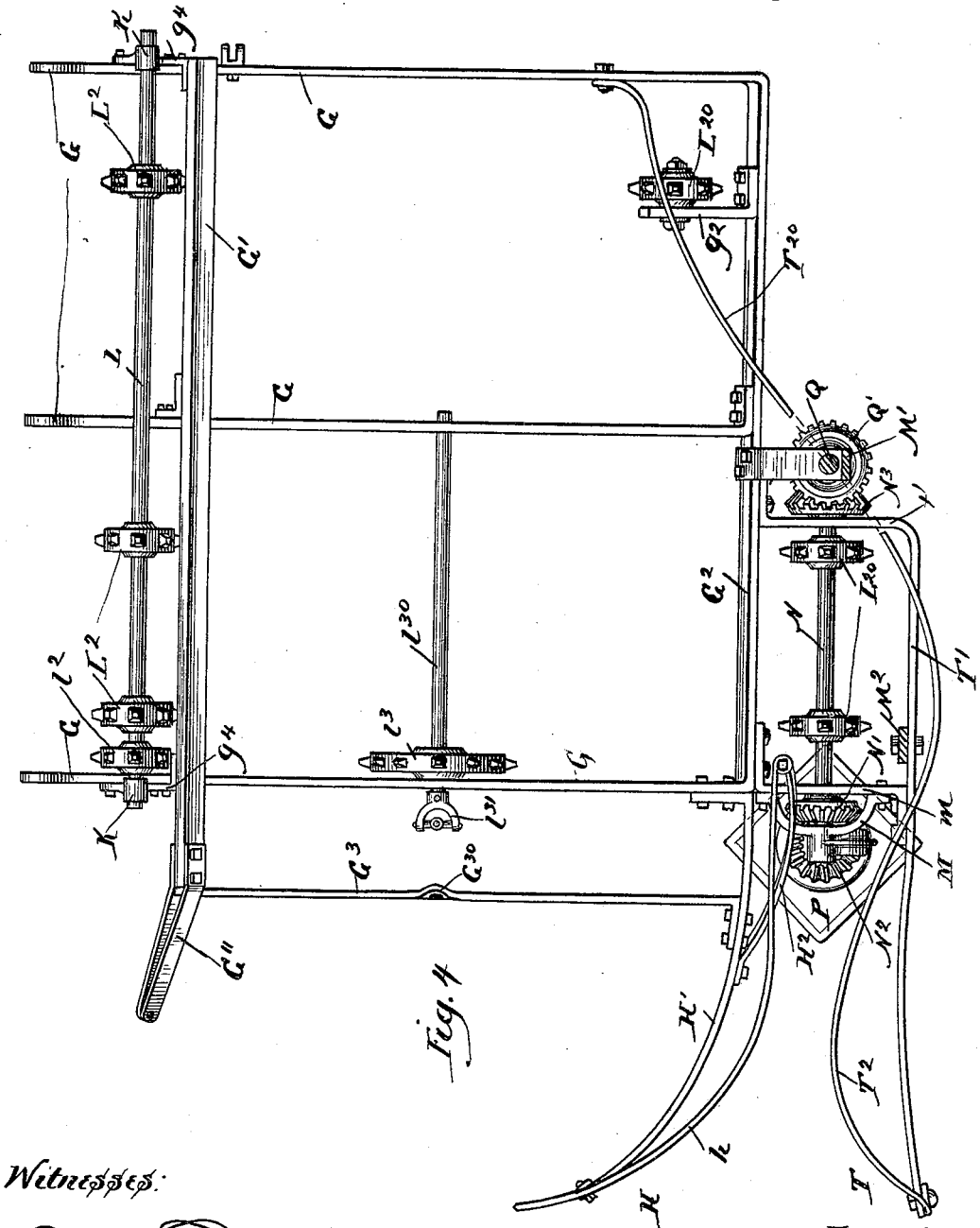

(No Model.) 5 Sheets—Sheet 5.

A. STARK.
CORN HARVESTER.

No. 480,975. Patented Aug. 16, 1892.

Witnesses:
Jean Elliott.
Julia Usler.

Inventor:
Andrew Stark
By Burton & Burton
his Attorneys

UNITED STATES PATENT OFFICE.

ANDREW STARK, OF CHICAGO, ILLINOIS.

CORN-HARVESTER.

SPECIFICATION forming part of Letters Patent No. 480,975, dated August 16, 1892.

Application filed May 12, 1891. Serial No. 392,474. (No model.)

*To all whom it may concern:*

Be it known that I, ANDREW STARK, a citizen of the United States, residing at Chicago, county of Cook, and State of Illinois, have invented certain new and useful Improvements in Corn-Harvesters, which are fully set forth in the following specification, reference being had to the accompanying drawings, forming a part thereof.

This invention comprises mechanism for cutting corn and delivering the cut stalks to a binder located in the position occupied by the binder in the customary styles of grain-harvesters, or, if preferred, delivering the stalks over the binder-deck unbound to the ground. It is designed to be applicable to any form of harvester or to a machine constructed similarly to familiar types of harvesters in respect to the driving frame and train, which transfers power from the wheel to the mechanism, and it comprises distinctive mechanism for gathering and cutting the stalks and delivering them to the binder-deck.

In the drawings I have shown my invention applied to a certain familiar type of grain-harvester, the driving and binding devices which I have illustrated being adopted bodily from such grain-harvester, and to the main frame of such grain-harvester I have applied, in lieu of the usual grain cutting and conveying mechanisms, corresponding devices pertaining to my invention.

Figure 6:
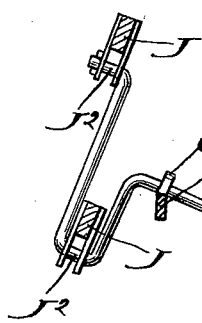
Figure 5:
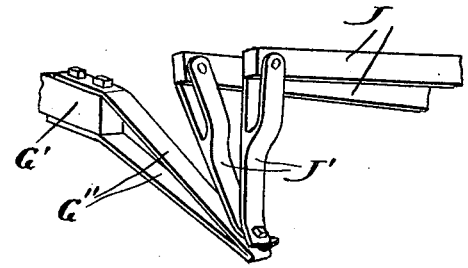
Figure 8:
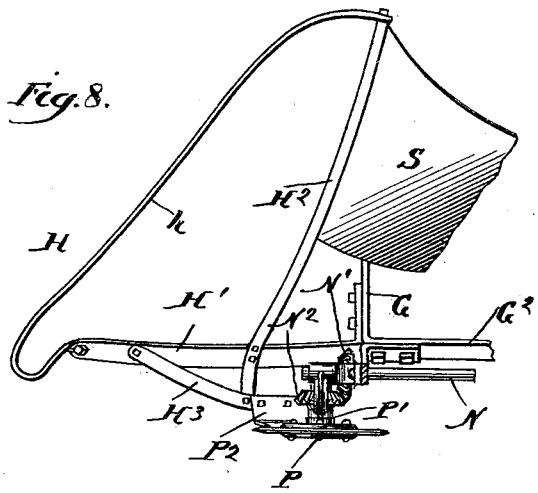
Figure 9:
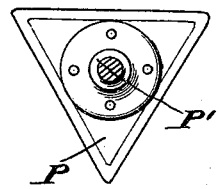
Figure 7:
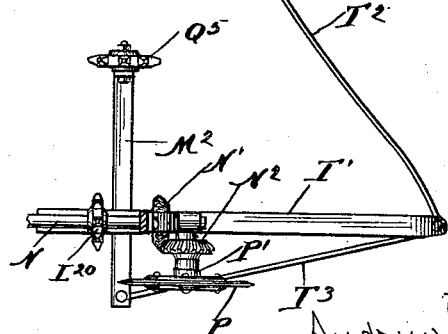

Figure 1 is a plan, the binder and driving mechanism being represented only conventionally or in so far as they are represented in detail, being without attempt at completeness, inasmuch as these do not pertain to the invention. Fig. 2 is a front elevation of the portions which embody my invention. Fig. 3 is a plan of a grainwardly-produced base-frame for supporting the gathering, cutting, and elevating devices. Fig. 4 is a plan of a sliding frame which carries the cutting and elevating and other devices, but partly stripped of the mechanism. Fig. 5 is a detail perspective of the parts $G^{11}$ and $J'J'$ seen in Figs. 1 and 2. Fig. 6 is a detail grain-side elevation of a universal joint and oblique shaft and connections therefrom for driving the stalk-lifting arms. Fig. 7 is a detail elevation of the grainward stalk-gathering arms, seen looking grainward. Fig. 8 is a detail elevation of the stubbleward stalk-gathering arms, seen looking stubbleward. Fig. 9 is a detail of a modified triangular form of stalk-cutter.

A represents the binder-deck.

A' represents, conventionally, the binder in the usual position above such deck. The driving and binder train is partially shown at B at the rear of the binder-deck in plan view, Fig. 1.

C represents the frame which extends around the drive-wheel.

$C'$ $C^{10}$ are rigid arms, which project from said drive-wheel frame grainward and downward. To these arms the framework which supports the gathering, cutting, and conveying mechanism is secured. This framework comprises the base-frame, which, as illustrated, is made up of the iron bar D D' $D^2$ and the bars $D^3$ and $D^4$, connected to it. The bar D D' $D^2$ is set edgewise and secured to the rear arm C' of the main frame, and extends thence grainward to the rear grainward corner of the machine, and is there bent forward in a position to afford bearing for the grain-wheel E, and at a point forward of such bearing is bent obliquely forward and stubbleward and secured to the pole or tongue F, which is rigid with the wheel-frame, being secured thereto forward of the wheel by the angle-brackets F' F', bolted to opposite sides of the pole and to the forward side of the main or wheel frame. To the forward arm $C^{10}$ the bar $D^3$ is secured, extending grainward to the oblique portion $D^2$ of the frame-bar D D' $D^2$, to which it is bolted rigidly.

$D^4$ is a channel-bar, which extends fore and aft across the frame-bar D D' $D^2$ between the grain-wheel and the vertical plane of the pole, and, as illustrated and as most conveniently located, it is about one-third of the distance from the grain-wheel to the pole. This bar crosses above the bar $D^3$ and the oblique portion $D^2$ and the rear portion D of the frame D D' $D^2$, being rigidly secured to each. It extends forward of the bar $D^2$ considerable distance, for a purpose which will hereinafter appear, and its forward end is braced and upheld by the brace $D^5$, extending obliquely backward and upward and secured to the pole F. The portion $D^2$ of the frame-bar D D' $D^2$ is bent upward at the point where the bar $D^4$ is joined to it, so that it extends obliquely upward and stubbleward and forward from that point to the point of its fastening to the pole F, and the brace-bar $D^5$, extending obliquely upward and stubbleward and rearward from the forward end of the bar $D^4$, crosses the oblique portion $D^2$ and may be rigid with the latter at the point of intersection, thereby stiffening both of said oblique bars. Upon the rigid frame thus constituted I mount a frame adapted to slide back and forward and carry the operating mechanism for gathering, cutting, and delivering the stalks of corn to the binder. This sliding frame comprises inclined parallel bars G G G, each of which at its upper end hangs and is adapted to slide on the bar $A^2$ of the main frame, said bar being that upon which the binder slides in its fore-and-aft adjustment. Extending from this point of support grainward with a downward slope said bars are united at their lower ends by a fore-and-aft bar $G^2$, and at a point above the channel-bar $D^4$ are provided with the supporting-legs $G^5$ $G^5$, which extend down to said channel-bar, being provided at their lower ends with rollers $G^6$, which run in the channel of said bar. Near the upper ends of said bars G are secured to them, respectively, the brackets K K, projecting upward and affording bearing for the tubular shaft L. In line with the bearings in said brackets rearward thereof there is provided a fixed bearing K' on the main frame, in which is journaled a shaft L', which is square forward of its bearing, such square portion telescoping within the tubular shaft L, whose opening is made square at the rear end for that purpose. Motion is communicated to the shaft L' from the driving-train by a chain over the sprocket-wheel $L^{10}$, secured to said shaft behind its bearing K'.

The grainward stalk-gathering arm, hereinafter described in detail, has a bar T', which is made rigid with the sliding frame at the grainward and lower side of the latter, said arm extending from its fastening to the sliding frame first directly grainward, and said portion t' furnishes a bearing for the horizontal shaft N, which is located in the inclined plane of the bars G G G grainward from said bars. Another bearing is obtained for the forward end of the shaft N in the gearing-bracket M m, of which the part m affords a brace for the gatherer-arm T.

On the shaft L are several (as illustrated, there are three) sprocket-wheels $L^2$ $L^2$ $L^2$, and in line with the two forward ones, respectively, fast on the shaft N, are corresponding sprocket-wheels $L^{20}$ $L^{20}$, and a third sprocket-wheel $L^{20}$ is journaled on a stud-axle secured to a bracket $g^2$, projecting from the bar $G^2$, said sprocket-wheel being in line with the rear sprocket-wheel $L^2$, and the elevating-chains O O O, provided with suitable teeth O' for carrying up the stalks run from the sprocket-wheels $L^2$, respectively, around the sprocket-wheels $L^{20}$, respectively, and either or both of the two forward chains thus drive the shaft N.

On the shaft N at the forward end there is secured the beveled gear N', and meshing with this beveled gear, journaled in the bracket M, is the horizontal beveled gear $N^2$, whose shaft, extending below the bearing, carries at its lower end the cutter P, which will hereinafter be described. At the rear end of the shaft N there is another beveled gear $N^3$, which meshes with the beveled gear Q' on the lower end of the shaft Q, which is journaled in the upright bracket M', which is rigidly secured to the sliding frame. At the upper end the shaft Q has the sprocket-wheel $Q^3$, which drives the chain $Q^4$, which passes around the sprocket-wheel $Q^5$, journaled on a stud-axle at the upper end of the bracket $M^2$, which is also rigidly supported by the sliding frame, as hereinafter explained. The axes of the sprocket-wheels $Q^3$ and $Q^5$ are in a plane which is oblique to a vertical plane through the shaft L, the wheel $Q^5$ being further grainward than the wheel $Q^3$, and the chain $Q^4$ has fingers $q^4$ to engage the stalks and move them with the stubbleward ply of the chain.

To the front and rear bars G, respectively, there are secured the upwardly-projecting brackets $g^4$ $g^4$, to the upper end of which I secure the fore-and-aft bar G', which extends parallel to the shaft L between the upper and lower ply of the chains O as near to the upper ply as may be, and to this bar G', I secure the sheathing g, which extends up stubbleward over the shaft L and down onto the binder-deck and extends grainward to the lower bar $G^2$, to which it is also secured. This sheathing is slotted at g' g' g' for the sprocket-wheels $L^2$ and $L^{20}$ and the chains O. This bar G' extends some distance forward of the forward chain O, projecting, therefore, from the forward side of the elevator, which consists of said carrying-chains O and the sheath g, and to the forward end of the bar G' there is secured the bar $G^3$, (a flat bar of iron set edgewise,) which extends parallel to the forward side of the elevator down grainward to the bar H' of the stubbleward gatherer hereinafter described. This bar $G^3$ serves as a means of support for certain parts hereinafter mentioned. To the end of the bar G' there is also attached an extension $G^{11}$, made of metal strap or bar folded upon itself and having the two ends embracing the end of the bar G' and bolted thereto, the said extension projecting downwardly forward from the end of the bar G', in order to form a pivot in an oblique direction and forward of and lower than the bar G' for the links J' J', which are pivoted near the point of said extension $G^{11}$ and extend obliquely rearward and upward from their pivot and at their rear ends are pivotally connected, respectively, to the stalk-lifting arms J. The operation of these arms will be hereinafter described. They are actuated by the following mechanism: Forward of the foremost sprocket-wheel $L^2$ the shaft L carries a small sprocket-wheel $l^2$, and a chain $l^{20}$, passing around said sprocket-wheel, drives the sprocket-wheel $l^3$, which is fixed on a short horizontal shaft $l^{30}$, for which suitable bearings are provided on the foremost and next rearward of the bars G. Forward of the foremost of said bars the shaft $l^{30}$ is connected by a toggle-joint $l^{31}$ to the shaft $j^2$, which extends from said toggle-joint obliquely upward to a bearing $G^{30}$ on the bar $G^3$, above described. Forward of said bearing the shaft $j^2$ has two obliquely-situated cranks $J^2 J^2$, on whose wrists the stalk-lifting arms J are pivoted. The cranks $J^2 J^2$ revolve in oblique planes substantially parallel to the extension $G^{11}$ of the bar $G'$, and the links $J' J'$, controlling the stubbleward ends of the stalk-lifting arms J, which are carried on said obliquely-revolving cranks, cause the said arms at their grainward points to describe certain paths hereinafter indicated and adapting them thereby for the function for which they are designed.

T and H are respectively the stubbleward and grainward stalk-gatherers. They are skeleton arms, which project forward from the sliding frame, to which they are rigidly secured and with which they move in the sliding movement of the frame, hereinafter described. They stand one on the grainward and one on the stubbleward side of the cutter and spread apart at their forward ends to gather the stalks between them. They are composed of bars or rods, which constitute their upper and lower boundaries, the upper bars being nearer together than the lower bars forward of the cutter, so that the gatherers, outlined by their upper and lower bars, respectively, may be said to lean toward each other, whereby they tend to gather the heads of the stalks, even when the butts or roots are considerably scattered.

The stubbleward stalk-gatherer H is composed of the flat iron bar $H'$, secured at its rear end to the forward side of the forward bar G at a point directly forward of the end of the bar $G^2$, and from that point of attachment it extends forward in a slightly-oblique direction, inclining stubbleward for about twenty-four inches, and then commences to curve quite abruptly stubbleward and extends in said curved direction about twenty-four inches farther. To its forward point another bar $h$ is bolted, which from its point of fastening to the bar $H'$ extends downward and forward and stubbleward a few inches and then returns, forming a loop at the very foremost point of the gatherer, and thence extends up obliquely grainward and rearward, passing in this portion of its course farther grainward than the portion of the bar $H'$ below it at this point, and finally extends rearward and upward to a point farther rearward than the foremost bar G, where it is supported by a nearly-upright bar $H^2$, which extends down to a point below the bar $H'$, and is there connected by the brace $H^3$ to the bar $H'$, said brace extending obliquely upward and forward from the lower end of the bar $H^2$ to make the connection with the bar $H'$. The upper bar $h$ of this gatherer adapts it to serve as a guide and guard for the stalk-lifting arms J J, whose path is between the bars $h$ and $H'$, following approximately the course of the bar $h$, as indicated by the dotted line, showing the path of the point of the stalk-lifting arms on Figs. 1 and 2.

The particular action of the stalk-lifting arms in relation to the gathering-arms will be hereinafter explained.

The grainward gatherer T comprises the bar $T'$, which is secured to the bar $G^2$ just forward of the bracket $M'$, and thence extends grainward to the fore-and-aft line of the part $D'$ of the base-frame, and there is bent forward and extends forward past the brackets $M^2$ and $m$, to which it is secured where it passes them, and thence still forward, curving slightly grainward toward the forward end, which is about as far forward as the point of the stubbleward gatherer.

To the forward point of the bar $T'$ there is secured the rod or bar $T^2$, which extends from that point upward and stubbleward and rearward, and then still upward, swerving gradually grainward as it extends on rearward, reaching its highest point where it passes over the line of the bar $T'$ at about the intersection of said bar with the line of the foremost bar G, produced grainward. Thence it curves slightly further grainward, and returning stubbleward and downward, while extending rearward, passes above the shaft Q, descending rapidly and curving grainward and rearward, and at the rearward end, bending downward, is attached to the rearmost bar G. The portion of the rod or bar $T^2$, which is rearward of the vertical plane of the foremost bar G is specifically denoted $T^{20}$ and performs a function as a stalk-guide different from that of the gatherer proper, which will be hereinafter described. As a part of the gatherer the rod $T^2$ may be considered as terminating where it crosses above the line of the bar G. From the forward point of the bar $T'$ there is also extended the brace-rod $T^3$ downward and rearward to the lower end of the bracket $M^2$, thus bracing the grainward gatherer.

The cutter P is a square or triangular plate sharpened to knife-edges all around and revolved horizontally by the vertical shaft of gear $N^2$, journaled in the bracket M. This cutter is fastened in any secure manner, as by means of the flange-collar $P'$, fixed on the shaft and adapted to have the knife plate or cutter bolted to it, as illustrated. This cutter performs its function of severing the stalks as it revolves, each of its angles operating as a cutter, severing with a shearing action the stalks which are advanced within the circle described by the angles and toward the circle described by the middle points of the sides during the interval between the passage of two consecutive angles through the stalk-space between the gatherer-arms as the cutter revolves.

$P^2$ is a guard, which is supported by the bar $H^3$ and overhangs the cutter P as far as the circumference of a circle described by the middle point of the sides of the cutter, leaving open the space above the cutter between the termination of the guard and the central support of the cutter, through which space the stalks may be carried by it around rearward toward the prostrating devices. The momentum which this cutter acquires causes it to sever the stalks easily and without appreciable retardment of its motion, so that it serves to an extent as a balance-wheel or storage-wheel for power.

The cutter-plate, as above indicated, may be either square or triangular, and I have in Fig. 9 illustrated the latter form, while the square form is shown in the principal figures; but a greater number of cutting sides than four is not desirable and re-entrant angles are also to be avoided in order to retain the evenness and ease of action in cutting which is characteristic of a regular polygonal cutter of few sides.

The operation of the mechanism thus far described is as follows: Power being communicated by the travel of the machine over the ground, the shaft L is revolved by the sprocket-wheel $L^{10}$ on the main frame, and the chain O, passing over the sprocket-wheels $L^2$ and $L^{20}$, communicates rotary motion to the shaft N, which, through the beveled gears $N'$ and $N^2$, drives the cutter P and through the beveled gear $N^3$ drives the beveled gear $Q'$, and thereby the shaft Q, the sprocket-wheel $Q^3$, and the chain $Q^4$, which passes around the sprocket-wheel $Q^5$, as described. At the same time the sprocket-wheel $L^2$ on the shaft L, through the chain $l^{20}$, sprocket-wheel $l^3$, shafts $l^{30}$ and $j^2$ drives the cranks $J^2$ $J^2$, which operate the stalk-lifting bars J, causing them alternately to sweep obliquely over the path indicated by the dotted line at their points in Figs. 1 and 2, entering with a thrusting movement through the loop at the lower forward end of the stubbleward gatherer into the stalk-space between the gatherers, and then sweeping upward and rearward to a point over the cutter P, and then withdrawing stubbleward out of said gatherer and returning to the starting-point. In this action the stalk-gathering-arms are thrust forward of the standing stalks and under and forward of such of them as may be prostrated forwardly from the hills and rising with their rearward movement lift the stalks to upright position, and with a tendency also to lean rearward by the time the cutter reaches them, so that when they are severed by the cutter, whatever may have been their position, whether upright or inclined or prostrate, they stand on the cutter with a tendency to fall rearward, and the forward movement of the entire machine, thus carrying them as they rest upon the cutter at the base, tends to cause them to fall rearward. At this juncture the stalks are engaged by the fingers $q^4$ of the prostrating-chain $Q^4$. This chain, being from two to three feet above the level of the cutter and having its stubbleward or stalk-engaging ply traveling obliquely rearward and stubbleward, tends to prostrate the stalks obliquely rearward and stubbleward, being prevented from carrying them with it bodily by the portions of the sliding frame which extend across the path of the stalks rearward of the cutter—that is to say, rearward of the axis of the cutter. Such obstructions may be afforded by the foremost bar G being extended grainward past the bar $G^2$ and past the bracket M $m$, or it may be afforded by any projection of or part secured to the bracket itself at the grainward side. In the drawings the part $m$ may be considered either as an extension of the bar G, or, as above described, as a part of the bracket M. It will be obvious that the butts of the stalks as the stalks are falling rearward will be engaged by the foremost of the carrying-chains O before the middle or rear of the stalks are similarly engaged by the other carrying-chains, and that therefore the butts are liable to be carried up the elevator in advance of the heads, but the direction in which the stalks are prostrated, as described, obliquely stubbleward, compensates for the advantage which the forward elevator-chain has over the other chains in point of time of engagement with the stalks by causing the heads of the stalks when they finally reach the elevator, being fully prostrated, to reach it high up—that is to say, farther advanced than were the heads when they were engaged by the forward chain—so that the stalks will be carried up in a position approximately parallel with the course of travel; but I prefer that the obliquity of the prostrating movement be such relatively to the speed of the elevating-chains that, notwithstanding the advantage which the forward chain has in respect to its time of engaging the stalks, the heads of the stalks will be carried up the elevator in advance of the butts. The direction in which the stalks are prostrated is further modified or controlled by the rearward portion $T^{20}$ of the upper bar $T^2$ of the grainward gatherer, which in the part which is located rearward of the cutter has simply the function of guiding the stalks as they fall. It will be observed that the portion of this bar which is rearward of the prostrating-chain $Q^4$ extends even more obliquely stubbleward than does the chain itself. By the time the stalks have leaned so far rearward as to rest against this portion of the bar $T^2$ they are practically free from the prostrating-chain and the direction of their fall will be determined by the direction of said bar, which, it will be noticed, extends downward, rearward, and stubbleward to its point of fastening to the rear bar G. The portion of said rod or bar $T^2$ which is above the prostrating-chain is curved out grainward from the stalk-actuating ply of said chain, so that it will not interfere with the action of that chain or tend to prevent the stalks from being well engaged by its fingers; but at this portion this bar serves to prevent the stalks from leaning over and being engaged by the fingers on the return-ply of the chain $Q^4$, as might otherwise happen.

In order to retain the stalks compactly on the elevator and to insure the stalks being engaged promptly by the teeth on the elevator-chains, I provide a cover S for the elevator, which may be made of sheet metal, secured at one edge to the upright bar $H^2$ of the grainward gatherer, and from that edge curving downward and rearward and stubbleward in a conical form, becoming eventually approximately parallel with the course of the elevator-chains and being there supported by the bar S', which extends fore and aft in a somewhat oblique direction across the elevator at a distance above the chains a little greater than the length of the teeth. Support for this bar may be obtained in any convenient way, as by the upwardly-projecting support $S^{10}$, secured to the bar $G^3$. It will be observed that the shape of this portion of the cover S is approximately that which would be outlined by the stalks in their fall rearward onto the elevator as they would be actuated and guided by the prostrating-chain and the bar $T^2$, and that this cover thereby tends to hold the stalks in engagement with the prostrating-chain and prevents them from falling in a scattered manner into the elevator. The cover is continued stubbleward from the bar S' in the leaf $S^2$, connected at its grainward edge with the bar S', and being thereby a direct continuation of the conically-shaped portion S, and having the spring-arms $S^3 S^3$ secured to its grainward edge and extending up over the top of the elevator-sheath and there resting thereon, except as lifted up by the stalks as they pass over the top of the elevator, and thus floating on the stalks with a tendency to hold them down and keep them in engagement with the chains. An important feature of this construction is that the entire mechanism for gathering, cutting, prostrating, and elevating the stalks is supported on the frame, which slides bodily and carries all said mechanism fore and aft with respect to the main frame and with respect to the binder-deck. This sliding movement may be effected in any obvious manner.

The entire frame as described is supported at its upper end on the bar $A^2$, on which the binder slides in the ordinary construction of harvesters, (although I do not limit myself to supporting it on that identical bar,) and its weight is chiefly supported by the channel-bar $D^4$, in which the rollers at the end of the supporting-legs $G^5$ travel as the frame is moved backward and forward. A lever U, attached to any convenient portion of the harvester-frame where it may be grasped by the driver, may be connected by a link U' at any convenient point to the sliding frame, as to the rear bar G, and the driver may thereby slide the frame back and forward, as the condition of the corn may require, the square portion of the shaft L' telescoping within the shaft L to communicate the motive power to the mechanism upon the sliding frame at all positions of the latter. The necessity for thus adjusting the frame fore and aft arises out of the varying height of the corn, and the range of such variation is much greater than that of small grain, and the adjustment is correspondingly greater, the necessity being the same in both cases to bring the portion of the stalks or grain where the band is to be applied to the proper position—that is, in the vertical plane of the binder-arm. For such adjustment I utilize the full range of adjustability of the binder effected in the ordinary manner and add thereto the adjustment of which the sliding frame and its mechanism is capable. In view of the fact that the range of forward adjustment is necessarily so much greater than that necessary for the binder in the case of small grain, I extend the bar $A^2$, on which the binder slides, forward a corresponding distance and give the sliding frame a support on the forwardly-extended portion by means of the hanger $F^3$, secured to the pole F and extended up and hooked onto said extended bar $A^2$. I find a great advantage resulting from adjusting all the corn-handling mechanism together, as compared with merely adjusting the elevator or whatever mechanism might be employed to deliver the corn to the binder-deck, since the proper relation between the gathering, stalk-lifting, cutting, prostrating, and elevating devices, being once established in the construction of a machine, is never disturbed by the adjustments necessary to make in its operation; but I do not limit myself to adjusting all of said mechanisms together, a more fundamental characteristic of my invention being that tall corn is accommodated to an open-front binder by adjusting the cutter forward, as distinguished from the customary method of accommodating tall grain, which is by adjusting the binder rearward, and this feature is equally applicable to a grain-harvester as to a corn-harvester; but its importance is greater in case of the corn-harvester, on account of the fact that corn varies in height much more than small grain, and the range of adjustment is consequently much greater and the equipoise of the machine is much less disturbed by shifting the fore-and-aft mechanism, whose weight is located low down toward the ground, as is the case with the gathering and cutting and elevating mechanisms, than by shifting to an equal extent a mechanism which is necessarily located higher, as is the binder. As a further means of avoiding undue disturbance of the equipoise of the machine, I utilize the ordinary adjustability of the binder itself on the main frame by shifting the binder rearward, while the frame carrying the other mechanisms is shifted forward, and vice versa.

It is desirable to bind corn well up toward the top of the stalks, because thus the band is above the ears and encircles the smaller part of the stalk, and a shorter band is therefore required, and thus the base of the bundle is spread and it is thereby better adapted to stand in shock. Even the tallest corn can be satisfactorily bound at a distance from the top of the stalks not much greater than the maximum distance which is satisfactory in the case of medium or short length stalks. The excess of length of tall stalks over short ones is thus chiefly below the desirable point for the band. On this account a rear-driven or open-front binder is preferable for binding corn and makes the most desirable combination with a cutting mechanism which is adjustable fore and aft; but I do not limit myself to the use of my invention in combination with a rear-driven binder.

I claim—

1. In a corn-harvester, in combination with the main frame and rear-driven binder mounted thereon at the stubbleward side of the drive-wheel, a frame supported on the main frame and movable backward and forward thereon at the grainward side of the drive-wheel, and cutting mechanism mounted on such movable frame, substantially as set forth.

2. In a corn-harvester, in combination with a main frame and a rear-driven binder mounted thereon at the stubbleward side of the drive-wheel, a frame supported on the main frame at the grainward side of the drive-wheel and movable backward and forward with respect to the main frame, and cutting and elevating mechanisms mounted on such movable frame, substantially as set forth.

3. In a corn-harvester, in combination with the main frame and the binder adjustable fore and aft thereon, a frame supported and adjustable fore and aft on the main frame and carrying the cutting mechanism, substantially as set forth.

4. In a corn-harvester, in combination with the cutting mechanism, a stalk-gathering arm projecting forward from the stubbleward side of the cutting mechanism and diverging stubbleward from the line of the cut and open or in skeleton, and a stalk-lifting arm oscillating and reciprocating through the gathering-arm in a plane inclined obliquely rearward and upward from the point of the stalk-gathering arm to the vertical plane of the cutter, substantially as set forth.

5. In a corn-harvester, in combination with the stalk-cutting mechanism, a stalk-gathering arm which projects forward of the same, a pair of stalk-lifting arms pivoted to the frame which carries the cutting mechanism at a point stubblewardly remote from the stalk-gathering arms, and mechanism which operates said stalk-lifting arms with an oscillating and reciprocating movement to thrust them grainwardly past the vertical plane of the gatherer at the forward part thereof and with an upwardly and rearwardly sweeping movement thence to the vertical plane of the cutter and withdraw them thence stubblewardly at the rearward limit of such rearward movement, whereby such stalk-lifting arms each traverse substantially the fore-and-aft space between the stalk-gathering arms, substantially as set forth.

6. In a corn-harvester, in combination with the stalk-cutter, the inclined elevator located rearward from the cutter, and the stalk-guide arm $T^2$, extending in an oblique direction from a point above the foot of the elevator rearward and stubbleward to guide the heads of the stalks toward the upper end of the elevator as they fall rearward, substantially as set forth.

7. In a corn-harvester, in combination with the cutter and an inclined elevator in the rear thereof, a prostrating mechanism overhanging the lower portion of the elevator and operating obliquely rearward and stubbleward, and the stalk-guiding arm $T^2$, overhanging the rear portion of the elevator and extending obliquely rearward and stubbleward from the rear end of the prostrating mechanism, substantially as and for the purpose set forth.

8. In a corn-harvester, in combination with the stalk-cutter and an elevator located rearward therefrom and inclined stubbleward and upward at right angles to the direction of travel, stalk-prostrating mechanism comprising an endless toothed chain located rearward from the vertical plane of the cutter and at the grainward side of the path of the stalks, and having its stalk-actuating movement in a direction obliquely rearward and stubbleward and at its discharge end overhanging the elevator, substantially as set forth.

In testimony whereof I have hereunto set my hand, at Chicago, Illinois, in the presence of two witnesses, at this 21st day of February, 1891.

ANDREW STARK.

Witnesses:
CHAS. S. BURTON,
JEAN ELLIOTT.